(12) United States Patent
Yuhara (10) Patent No.: US 12,091,348 B2
(45) Date of Patent: Sep. 17, 2024

(54) APPARATUS AND METHODS FOR MANUFACTURING A GLASS SUBSTRATE

(71) Applicant: CORNING INCORPORATED, Corning, NY (US)

(72) Inventor: Yukio Yuhara, Kakegawa (JP)

(73) Assignee: CORNING INCORPORATED, Corning, NY (US)

( * ) Notice: Subject to any disclaimer, the term of this patent is extended or adjusted under 35 U.S.C. 154(b) by 863 days.

(21) Appl. No.: 16/623,662

(22) PCT Filed: Jul. 5, 2018

(86) PCT No.: PCT/US2018/040853
§ 371 (c)(1),
(2) Date: Dec. 17, 2019

(87) PCT Pub. No.: WO2019/014039
PCT Pub. Date: Jan. 17, 2019

(65) Prior Publication Data
US 2021/0139364 A1 May 13, 2021

Related U.S. Application Data

(60) Provisional application No. 62/531,482, filed on Jul. 12, 2017.

(51) Int. Cl.
*C03B 33/02* (2006.01)
*B08B 1/12* (2024.01)
(Continued)

(52) U.S. Cl.
CPC ............ *C03B 33/0215* (2013.01); *B08B 1/12* (2024.01); *B08B 1/30* (2024.01); *B08B 5/04* (2013.01); *C03B 17/06* (2013.01)

(58) Field of Classification Search
CPC ............................................. C03B 33/105–107
See application file for complete search history.

(56) References Cited

U.S. PATENT DOCUMENTS 2,914,784 A * 12/1959 Floyd .................... C03B 33/033
15/4
3,146,926 A 9/1964 Huffman et al.
(Continued)

FOREIGN PATENT DOCUMENTS

CN 2031652 U 2/1989
CN 1075246 A 8/1993
(Continued)

OTHER PUBLICATIONS

SXJSHTTX bottle cutter (Year: 2019).*
(Continued)

*Primary Examiner* — Jodi C Franklin
(74) *Attorney, Agent, or Firm* — Kevin M. Able (57) ABSTRACT

A glass manufacturing apparatus can include an elongated engagement surface rotatable through a rotation angle between a scoring position and a cleaning position. The glass manufacturing apparatus can further include a scoring device to score the glass substrate when the elongated engagement surface is positioned in the scoring position. The glass manufacturing apparatus can further include a cleaning device to clean the elongated engagement surface when the elongated engagement surface is positioned in the cleaning position. In further embodiments, a method of scoring a glass substrate can include, after producing a score line while the elongated engagement surface is positioned in the scoring position, rotating the elongated engagement surface from the scoring position to a cleaning position. The method can further include cleaning the elongated engage-
(Continued)

ment surface while the elongated engagement surface is positioned in the cleaning position.

21 Claims, 7 Drawing Sheets

(51) Int. Cl.
    *B08B 1/30*           (2024.01)
    *B08B 5/04*           (2006.01)
    *C03B 17/06*          (2006.01)

(56) References Cited

U.S. PATENT DOCUMENTS

| | | | |
|---|---|---|---|
| 3,592,370 A * | 7/1971 | Boardman | C03B 33/033 225/2 |
| 3,626,795 A * | 12/1971 | White | C03B 33/03 83/37 |
| 4,948,025 A * | 8/1990 | Lisec | C03B 33/033 225/104 |
| 5,878,866 A | 3/1999 | Lisec | |
| 6,502,423 B1 | 1/2003 | Ostendarp et al. | |
| 7,234,620 B2 | 6/2007 | Andrewlavage, Jr. | |
| 7,260,959 B2 | 8/2007 | Chang et al. | |
| 7,553,390 B2 * | 6/2009 | Yamabuchi | C03B 33/033 156/257 |
| 7,837,536 B2 * | 11/2010 | Haneda | B24D 13/10 451/41 |
| 7,895,861 B2 | 3/2011 | Chalk et al. | |
| 8,146,385 B2 | 4/2012 | Delia et al. | |
| 8,245,539 B2 | 8/2012 | Lu et al. | |
| 8,292,141 B2 * | 10/2012 | Cox | B26F 3/002 225/2 |
| 8,756,817 B2 * | 6/2014 | Cavallaro, III | C03B 33/0235 30/2 |
| 8,820,599 B2 | 9/2014 | Cavallaro, III et al. | |
| 8,844,419 B2 | 9/2014 | Walian | |
| 8,887,529 B2 | 11/2014 | Lu et al. | |
| 8,887,530 B2 | 11/2014 | Markham et al. | |
| 9,216,924 B2 | 12/2015 | Chang et al. | |
| 9,278,878 B2 | 3/2016 | Brackley et al. | |
| 9,458,048 B2 | 10/2016 | Sasaki et al. | |
| 9,643,875 B2 | 5/2017 | Brunello et al. | |
| 9,771,298 B2 | 9/2017 | Linnhoff et al. | |
| 2005/0056127 A1 * | 3/2005 | Yamabuchi | C03B 33/033 83/13 |
| 2006/0280920 A1 | 12/2006 | Abbott | |
| 2007/0063402 A1 | 3/2007 | Soyama | |
| 2009/0025752 A1 * | 1/2009 | Rui | B08B 1/008 134/6 |
| 2009/0191798 A1 | 7/2009 | Koh | |
| 2010/0294748 A1 | 11/2010 | Garner et al. | |
| 2011/0094267 A1 | 4/2011 | Aniolek et al. | |
| 2011/0130079 A1 * | 6/2011 | Sgarabottolo | C03B 33/04 451/461 |
| 2012/0210842 A1 * | 8/2012 | Brackley | B26D 7/08 83/880 |
| 2013/0291703 A1 | 11/2013 | Walian | |
| 2014/0216107 A1 | 8/2014 | Brunello et al. | |
| 2015/0299021 A1 * | 10/2015 | Itoh | C03B 33/091 83/880 |
| 2016/0068424 A1 * | 3/2016 | Renz | C03B 33/0235 225/2 |
| 2016/0152507 A1 | 6/2016 | Brown et al. | |
| 2016/0229732 A1 * | 8/2016 | Yao | C03B 33/03 |
| 2018/0001434 A1 | 1/2018 | Shafrir | |
| 2018/0071881 A1 | 3/2018 | Horie et al. | |

FOREIGN PATENT DOCUMENTS

| | | |
|---|---|---|
| CN | 101186020 A | 5/2008 |
| CN | 102050563 A | 5/2011 |
| CN | 102503107 A | 6/2012 |
| CN | 102701576 A | 10/2012 |
| CN | 202606463 U | 12/2012 |
| CN | 103130407 A | 6/2013 |
| CN | 103659885 A | 3/2014 |
| CN | 203479825 U | 3/2014 |
| CN | 203845939 U | 9/2014 |
| CN | 104072096 A | 10/2014 |
| CN | 203987841 U | 12/2014 |
| CN | 104276748 A | 1/2015 |
| CN | 104496405 A | 4/2015 |
| CN | 204336812 U | 5/2015 |
| CN | 104854044 A | 8/2015 |
| CN | 103364872 B | 10/2015 |
| CN | 105110619 A | 12/2015 |
| CN | 105130212 A | 12/2015 |
| CN | 204897725 U | 12/2015 |
| CN | 105236720 A | 1/2016 |
| CN | 204950779 U | 1/2016 |
| CN | 204993470 U | 1/2016 |
| CN | 103347828 B | 6/2016 |
| CN | 105776835 A | 7/2016 |
| CN | 205368117 U | 7/2016 |
| CN | 205387544 U | 7/2016 |
| CN | 205420166 U | 8/2016 |
| CN | 205585947 U | 9/2016 |
| CN | 205616784 U | 10/2016 |
| CN | 106142761 A | 11/2016 |
| CN | 205765382 U | 12/2016 |
| CN | 205856312 U | 1/2017 |
| DE | 4200751 A1 | 9/1992 |
| DE | 59405632 | 6/1995 |
| DE | 19861142 C2 | 1/2002 |
| EP | 212614 A2 | 3/1987 |
| EP | 653173 A1 | 5/1995 |
| EP | 347429 B1 | 1/1996 |
| EP | 578058 B1 | 1/1997 |
| EP | 2100860 A2 | 9/2009 |
| EP | 2114618 A1 | 11/2009 |
| GB | 0835652 A | 5/1960 |
| GB | 0900983 A | 7/1962 |
| JP | 05056928 A | 3/1993 |
| JP | 11283951 A | 10/1999 |
| JP | 2000050957 A | 2/2000 |
| JP | 2000060641 A | 2/2000 |
| JP | 2000180808 A | 6/2000 |
| JP | 2000191332 A | 7/2000 |
| JP | 03118142 B2 | 12/2000 |
| JP | 2002329761 A | 11/2002 |
| JP | 2003145060 A | 5/2003 |
| JP | 03515825 B2 | 4/2004 |
| JP | 03611122 B2 | 1/2005 |
| JP | 2005199371 A | 7/2005 |
| JP | 2005211722 A | 8/2005 |
| JP | 2007165554 A | 6/2007 |
| JP | 2008094693 A | 4/2008 |
| JP | 2008119621 A | 5/2008 |
| JP | 2008168202 A | 7/2008 |
| JP | 2010102811 A | 5/2010 |
| JP | 2010115587 A | 5/2010 |
| JP | 2010221305 A | 10/2010 |
| JP | 2010227766 A | 10/2010 |
| JP | 04760791 B2 | 8/2011 |
| JP | 04805033 B2 | 11/2011 |
| JP | 04938381 B2 | 5/2012 |
| JP | 03180624 U | 12/2012 |
| JP | 05279066 B2 | 9/2013 |
| JP | 05300124 B2 | 9/2013 |
| JP | 05363190 B2 | 12/2013 |
| JP | 2014065650 A | 4/2014 |
| JP | 05536993 B2 | 7/2014 |
| JP | 05650523 B2 | 1/2015 |
| KR | 596090 B1 | 7/2006 |
| KR | 1129830 B1 | 3/2012 |
| KR | 1202082 B1 | 11/2012 |
| KR | 10-2015-0084912 A | 7/2015 |
| TW | I300339 B | 9/2008 |
| TW | 201235319 A | 9/2012 |
| TW | 201240932 A | 10/2012 |
| TW | 201302634 A | 1/2013 |

(56) References Cited

FOREIGN PATENT DOCUMENTS

| | | |
|---|---|---|
| TW | I481577 B | 4/2015 |
| TW | 201722866 A | 7/2017 |
| WO | 03098654 A1 | 11/2003 |
| WO | 2008107087 A1 | 9/2008 |
| WO | 2011084561 A1 | 7/2011 |
| WO | 2016/126657 A1 | 8/2016 |
| WO | 2016/172065 A1 | 10/2016 |
| WO | 2016/199612 A1 | 12/2016 |
| WO | 2017/075133 A2 | 5/2017 |

OTHER PUBLICATIONS

Home pro shop bottle cutter (Year: 2019).*
Thinwork bottle cutter (Year: 2019).*
Chinese Patent Application No. 201880053460.7, Office Action dated Dec. 3, 2021, 17 pages (10 pages of English Translation and 7 pages of Original Copy), Chinese Patent Office.
International Search Report and Written Opinion of the International Searching Authority; PCT/US2018/040853; Mailed Nov. 15, 2018; 14 Pages; Korean Intellectual Property Office.
Taiwanese Patent Application No. 107123031, Notice of Allowance dated Oct. 18, 2021, 3 pages (English Translation Only); Taiwanese Patent Office.

* cited by examiner

FIG. 8

APPARATUS AND METHODS FOR MANUFACTURING A GLASS SUBSTRATE

CROSS-REFERENCE TO RELATED APPLICATIONS

This application claims the benefit of priority under 35 U.S.C. § 371 of International Application No. PCT/US18/40853, filed on Jul. 5, 2018, which claims the benefit of priority of U.S. Provisional Application Ser. No. 62/531,482 filed on Jul. 12, 2017 the contents of which are relied upon and incorporated herein by reference in their entirety as if fully set forth below.

FIELD

The present disclosure relates generally to methods and apparatus for manufacturing a glass substrate and, more particularly, to methods and apparatus for cleaning an elongated engagement surface that has been rotated from a scoring position to a cleaning position.

BACKGROUND

It is known to remove edges from a glass substrate by scoring the glass substrate to create a score line. The edges are then typically manipulated to separate the edges from the remaining portion of the glass substrate along the score line.

SUMMARY

The following presents a simplified summary of the disclosure to provide a basic understanding of some embodiments described in the detailed description.

In accordance with some embodiments, a glass manufacturing apparatus can include an elongated engagement surface rotatable through a rotation angle between a scoring position and a cleaning position. The glass manufacturing apparatus can further include a scoring device to score the glass substrate when the elongated engagement surface is positioned in the scoring position. The glass manufacturing apparatus can further include a cleaning device to clean the elongated engagement surface when the elongated engagement surface is positioned in the cleaning position.

In one embodiment, the scoring device can include a scoring wheel.

In another embodiment, the cleaning device can include a brush.

In another embodiment, the brush can be configured for linear reciprocal movement when the cleaning device is positioned in the cleaning position.

In another embodiment, the brush can include an elongated brush including an elongated length that may be greater than or equal to an elongated length of the elongated engagement surface.

In another embodiment, the cleaning device can include a vacuum device.

In another embodiment, the glass manufacturing apparatus can include an elongated member comprising the elongated engagement surface.

In another embodiment, the elongated member can include a resilient material.

In another embodiment, the elongated member can include a first elongated member and a second elongated member spaced a distance from the first elongated member.

In another embodiment, the rotation angle can be within a range of from 90 degrees to 270 degrees.

In accordance with some embodiments, a method is provided for manufacturing a glass substrate including a first major surface and a second major surface opposite the first major surface can include engaging the first major surface of the glass substrate with an elongated engagement surface while the elongated engagement surface is positioned in a scoring position and the glass substrate is positioned in a scoring zone. The method can further include scoring the second major surface of the glass substrate to produce a score line in the second major surface of the glass substrate. The score line can be produced while: the first major surface of the glass substrate is engaged with the elongated engagement surface, the elongated engagement surface is positioned in the scoring position, and the glass substrate is positioned in the scoring zone. The method can further include rotating the elongated engagement surface through a rotation angle from the scoring position to a cleaning position. The method can further include cleaning the elongated engagement surface while the elongated engagement surface is positioned in the cleaning position.

In another embodiment, cleaning the elongated engagement surface can include brushing the elongated engagement surface.

In another embodiment, cleaning the elongated engagement surface can include vacuuming debris.

In another embodiment, a second glass substrate can at least partially enter the scoring zone during cleaning of the elongated engagement surface.

In another embodiment, the rotation angle can be within a range of from about 90 degrees to about 270 degrees.

In another embodiment, scoring can include traversing a scoring wheel across the second major surface.

In another embodiment, the method can include separating the glass substrate along the score line.

In another embodiment, the score line can extend in a score direction, and a component of the score direction can include the direction of gravity.

In another embodiment, the glass substrate can include a glass sheet.

In another embodiment, the glass sheet can be hung from an upper portion of the glass sheet while scoring the second major surface.

BRIEF DESCRIPTION OF THE DRAWINGS

These and other features, embodiments and advantages are better understood when the following detailed description is read with reference to the accompanying drawings, in which.

DETAILED DESCRIPTION

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

It is to be understood that specific embodiments disclosed herein are intended to be exemplary and therefore non-limiting. For purposes of the disclosure, although not required, the glass manufacturing apparatus can optionally comprise a glass forming apparatus that forms a glass sheet and/or glass ribbon from a quantity of molten material. For example, the glass manufacturing apparatus can optionally include a glass forming apparatus such as a slot draw apparatus, float bath apparatus, down-draw apparatus, up-draw apparatus, press-rolling apparatus or other glass forming apparatus. The embodiment illustrated in FIG. 1 discussed below, the glass manufacturing apparatus can comprise a glass forming apparatus including a fusion down-draw apparatus although other glass forming apparatus maybe provided in further embodiments.

Furthermore, for purposes of the disclosure, although not required, the glass manufacturing apparatus can include a storage device for storing a previously-formed glass ribbon and/or glass sheet. For example, although not shown, the glass manufacturing apparatus may optionally include a storage spool including a length of the glass ribbon wound on the storage spool. In some embodiments, the glass manufacturing apparatus may unwind a portion of the glass ribbon from the storage spool during a method of manufacturing the glass ribbon.

Furthermore, for purposes of the disclosure, the glass manufacturing apparatus can include an optional scoring apparatus configured to score a glass ribbon and/or a glass sheet. For example, the scoring apparatus described throughout the disclosure may be used to separate edge portions from a central portion of a glass sheet. In further embodiments, the scoring apparatus may be used to separate a glass sheet from a glass ribbon. For example, a glass ribbon being formed with a glass forming apparatus or being unwound from a storage spool may be scored across a width of the glass ribbon to provide a separation path to separate a glass sheet from the glass ribbon.

Still further, for purposes of the disclosure, the glass manufacturing apparatus can include an optional separation apparatus designed to separate a portion of the glass ribbon and/or glass sheet along the score line produced by the scoring apparatus. The glass manufacturing apparatus can further include an optional glass handling apparatus designed to support a glass sheet while the glass sheet is being scored and/or while the glass sheet is being separated along the score line. Once scored with features of the disclosure, a glass sheet may be separated from the glass ribbon along the score line that is transverse (e.g., perpendicular) to the elongated length of the glass ribbon.

Still further, for purposes of the disclosure, the glass manufacturing apparatus can include an optional cleaning apparatus designed to clean debris generated during a scoring and/or a separation of the glass sheet and/or glass ribbon.

In further embodiments, as discussed below, various apparatus may be provided in-line to continuously manufacture glass at different glass manufacturing stations. For instance, by way of illustration, FIG. 1 demonstrates the glass manufacturing apparatus 101 including various apparatus that may be provided in-line such as a glass forming apparatus 101*a* designed to form glass ribbon 103, a first glass scoring and separation apparatus 101*b* to score and separate a glass sheet 104 from the glass ribbon 103, a glass handling apparatus 101*c*, and a second glass scoring and separation apparatus 101*d*. For purposes of the disclosure, the glass manufacturing apparatus 101 can include any one or any combination of one or more components such as the illustrated glass forming apparatus 101*a*, the first glass scoring and separation apparatus 101*b*, the glass handling apparatus 101*c*, and the second glass scoring and separation apparatus 101*d*. Such components are illustrated as an in-line arrangement for continuous manufacturing of a glass ribbon and glass sheet although the components may be provided separately out of line or the glass manufacturing apparatus 101 may include a single component of the above-referenced components (e.g., the first glass scoring and separation apparatus 101*b*, the second glass scoring and separation apparatus 101*d*, etc.).

In some embodiments, as discussed below, one or both edges of a glass sheet may be liberated from a high-quality central portion of the glass sheet by the second glass scoring and separation apparatus 101*d*. In such embodiments, the high-quality central portion of the glass sheet may be used in a wide variety of desired display applications, including liquid crystal displays (LCDs), electrophoretic displays (EPD), organic light emitting diode displays (OLEDs), plasma display panels (PDPs), or the like. Such liberated high-quality central portions of the glass sheets may need to be transported from one location to another. In some embodiments, the high-quality central portions of the glass sheets may be transported with a conventional support frame designed to secure a stack of glass sheets in place. Moreover, interleaf material can be placed between each high-quality central portion of glass to help prevent contact and therefore preserve the pristine surface of the high-quality central portion of the glass sheets.

Figure 1:
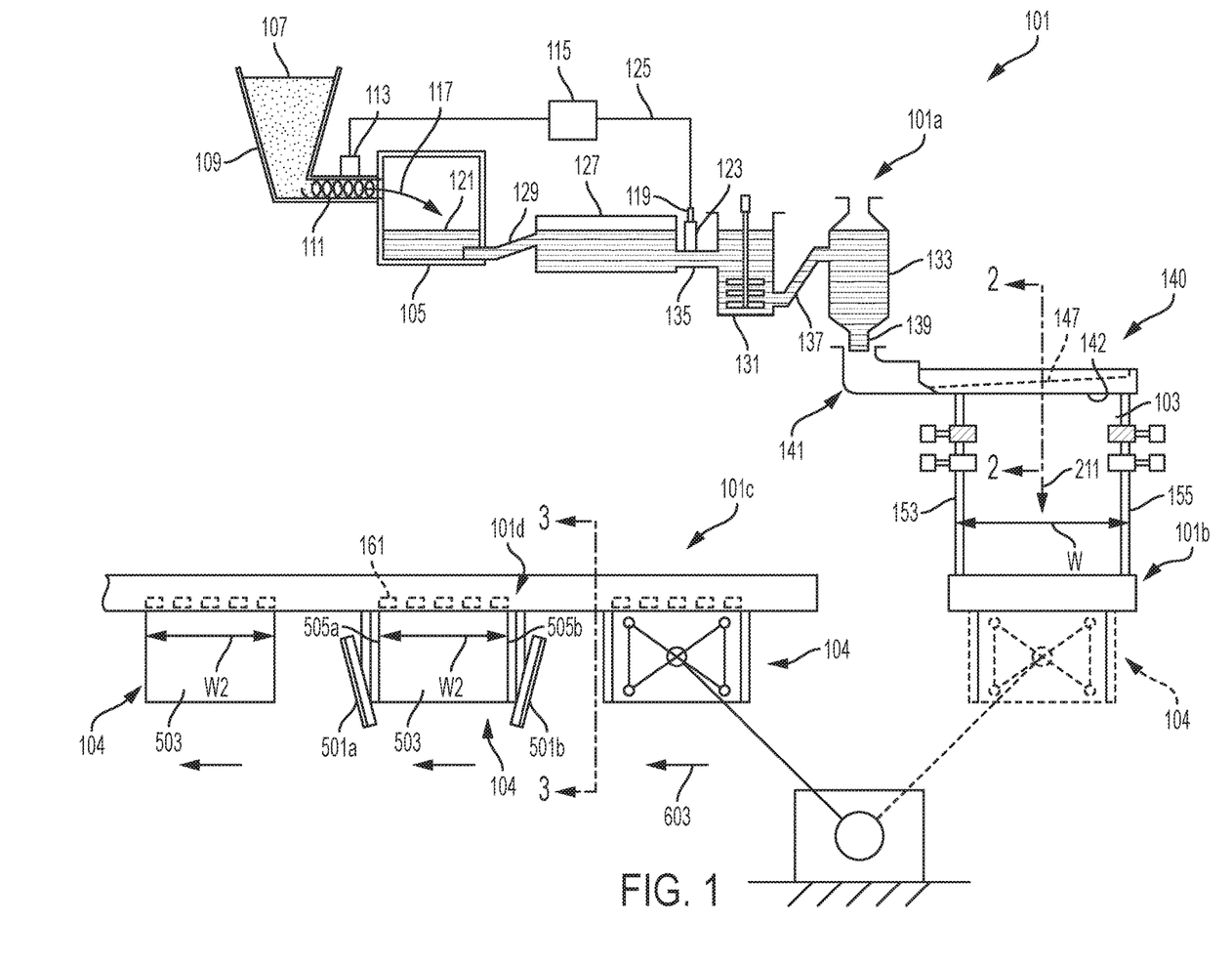
FIG. 1 illustrates a schematic view of an example embodiment of a glass manufacturing apparatus including an example embodiment of an apparatus for scoring and separating a glass substrate in accordance with the disclosure.

FIG. 1 schematically illustrates the exemplary glass manufacturing apparatus 101 including the glass forming apparatus 101*a* to draw a glass ribbon 103 from a quantity of molten material 121. As illustrated, the glass manufacturing apparatus 101 can include a melting vessel 105 oriented to receive batch material 107 from a storage bin 109. The batch material 107 can be introduced by a batch delivery device 111 powered by a motor 113. An optional controller 115 can be operated to activate the motor 113 to introduce a desired amount of batch material 107 into the melting vessel 105, as indicated by arrow 117. A glass melt probe 119 can be used to measure a level of molten material 121 within a standpipe 123 and communicate the measured information to the controller 115 by way of a communication line 125.

The glass manufacturing apparatus 101 can also include a fining vessel 127 located downstream from the melting vessel 105 and coupled to the melting vessel 105 by way of a first connecting conduit 129. In some embodiments, molten material 121 may be gravity fed from the melting vessel 105 to the fining vessel 127 by way of the first connecting conduit 129. For example, gravity may drive the molten material 121 to pass through an interior pathway of the first connecting conduit 129 from the melting vessel 105 to the fining vessel 127. Within the fining vessel 127, bubbles may be removed from the molten material 121 by various techniques.

The glass manufacturing apparatus 101 can further include a mixing chamber 131 that may be located downstream from the fining vessel 127. The mixing chamber 131 can be used to provide a homogenous composition of molten material 121, thereby reducing or eliminating cords of inhomogeneity that may otherwise exist within the molten material 121 exiting the fining vessel 127. As shown, the fining vessel 127 may be coupled to the mixing chamber 131 by way of a second connecting conduit 135. In some embodiments, molten material 121 may be gravity fed from the fining vessel 127 to the mixing chamber 131 by way of the second connecting conduit 135. For instance, gravity may drive the molten material 121 through an interior pathway of the second connecting conduit 135 from the fining vessel 127 to the mixing chamber 131.

The glass manufacturing apparatus 101 can further include a delivery vessel 133 that may be located downstream from the mixing chamber 131. The delivery vessel 133 can condition the molten material 121 to be fed into an inlet conduit 141. For example, the delivery vessel 133 can function as an accumulator and/or flow controller to adjust and provide a consistent flow of molten material 121 to the inlet conduit 141. As shown, the mixing chamber 131 may be coupled to the delivery vessel 133 by way of a third connecting conduit 137. In some embodiments, molten material 121 may be gravity fed from the mixing chamber 131 to the delivery vessel 133 by way of the third connecting conduit 137. For instance, gravity may drive the molten material 121 through an interior pathway of the third connecting conduit 137 from the mixing chamber 131 to the delivery vessel 133.

As further illustrated, a delivery pipe 139 can be positioned to deliver molten material 121 to the inlet conduit 141. The molten material 121 may then be delivered from the inlet conduit 141 to be received by a trough 147 of a forming vessel 140. The forming vessel 140 may draw the molten material 121 into the glass ribbon 103. For example, as shown, the molten material 121 may be drawn off of a root 142 of a forming vessel 140. A width "W" of the glass ribbon 103 can extend between a first vertical edge 153 of the glass ribbon 103 and a second vertical edge 155 of the glass ribbon 103.

Figure 2:
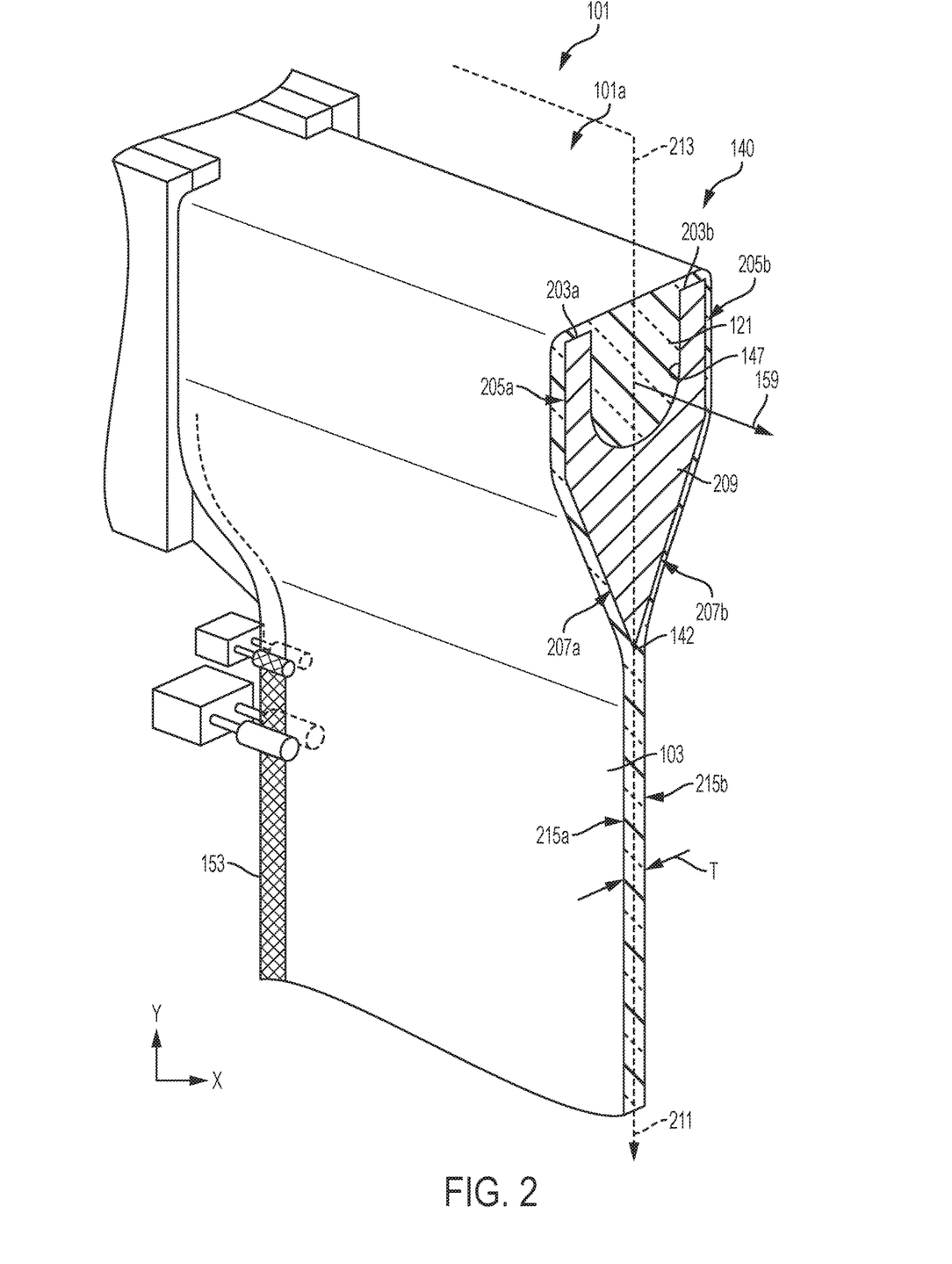
FIG. 2 illustrates a sectional view of the glass manufacturing apparatus taken along line 2-2 of FIG. 1.

FIG. 2 is a cross-sectional perspective view of the glass manufacturing apparatus 101 along line 2-2 of FIG. 1. As shown, the forming vessel 140 can include the trough 147 oriented to receive the molten material 121 from the inlet conduit 141. The forming vessel 140 can further include a forming wedge 209 including a pair of downwardly inclined converging surface portions 207a, 207b extending between opposed ends of the forming wedge 209. The pair of downwardly inclined converging surface portions 207a, 207b of the forming wedge 209 converge along a draw direction 211 to intersect along a bottom edge to define the root 142. A draw plane 213 extends through the root 142 wherein the glass ribbon 103 may be drawn in the draw direction 211 along the draw plane 213. As shown, the draw plane 213 can bisect the root 142 although the draw plane 213 may extend at other orientations relative to the root 142.

Referring to FIG. 2, in one embodiment, the molten material 121 can flow in a lateral direction 159 into the trough 147 of the forming vessel 140. The molten material 121 can then overflow from the trough 147 by simultaneously flowing over corresponding weirs 203a, 203b and downward over the outer surfaces 205a, 205b of the corresponding weirs 203a, 203b. Respective streams of molten material 121 then flow along the downwardly inclined converging surface portions 207a, 207b of the forming wedge 209 to be drawn off the root 142 of the forming vessel 140, where the flows converge and fuse into the glass ribbon 103. The glass ribbon 103 may then be fusion drawn off the root 142 in the draw plane 213 along draw direction 211 where the glass sheet 104 (see FIG. 1) may then be subsequently separated from the glass ribbon 103.

As shown in FIG. 2, the glass ribbon 103 may be drawn from the root 142 with a first major surface 215a of the glass ribbon 103 and a second major surface 215b of the glass ribbon 103 facing opposite directions and defining a thickness "T" of the glass ribbon 103 that can, for example, be less than or equal to about 2 millimeters (mm), less than or equal to about 1 millimeter, less than or equal to about 0.5 millimeters, less than or equal to about 500 micrometers (μm), such as less than or equal to about 300 micrometers, such as less than or equal to about 200 micrometers, or such as less than or equal to about 100 micrometers, although other thicknesses may be provided in further embodiments. In addition, the glass ribbon 103 can include a variety of compositions including but not limited to soda-lime glass, borosilicate glass, alumino-borosilicate glass, an alkali-containing glass, or an alkali-free glass.

Features of the second glass scoring and separation apparatus 101d of the glass manufacturing apparatus 101 will now be described with the understanding that similar features can optionally apply to first glass scoring and separation apparatus 101b. Indeed, in some embodiments, although not required, unless otherwise noted, features described with respect to the second glass scoring and separation apparatus 101d may equally apply to the first glass scoring and separation apparatus 101b.

Figure 4:
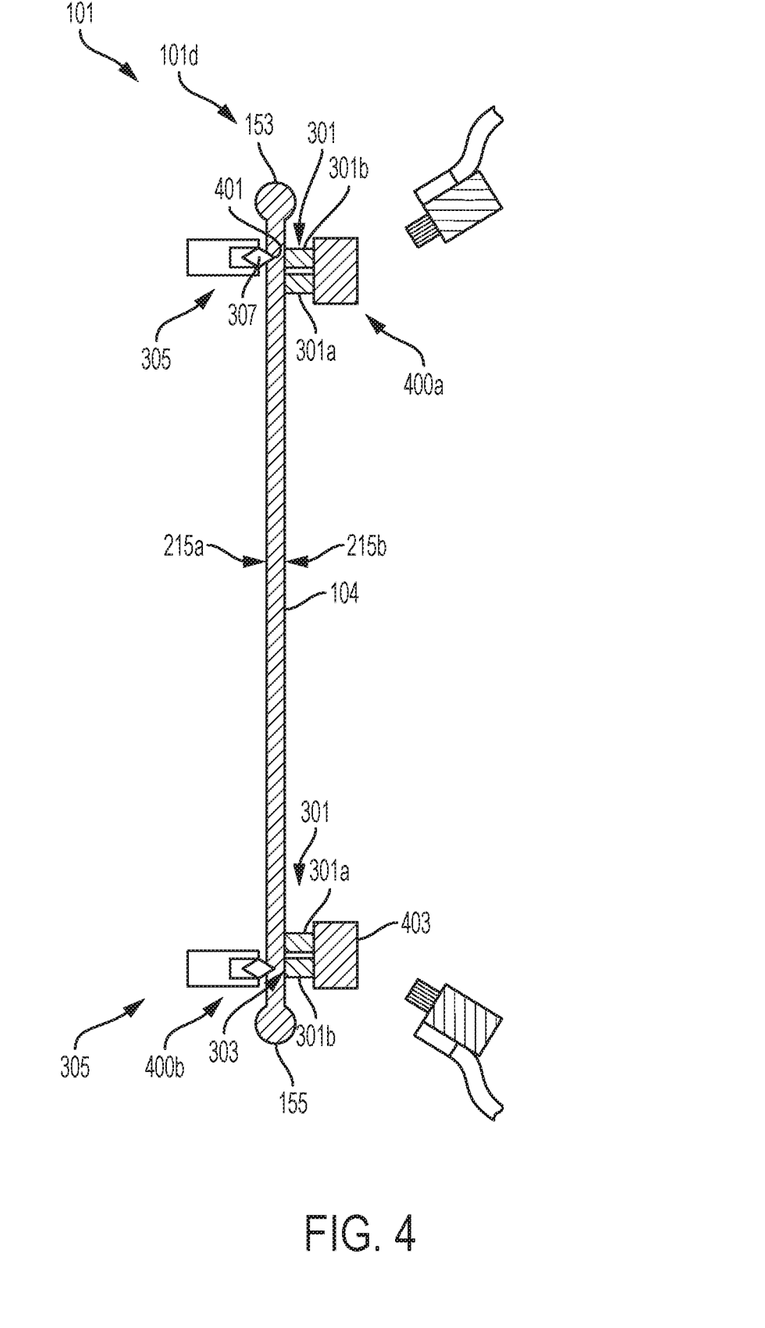
FIG. 4 is a sectional view of the glass manufacturing apparatus taken along line 4-4 of FIG. 3 illustrating the glass substrate being scored when an elongated engagement surface is positioned in a scoring position.
Figure 5:
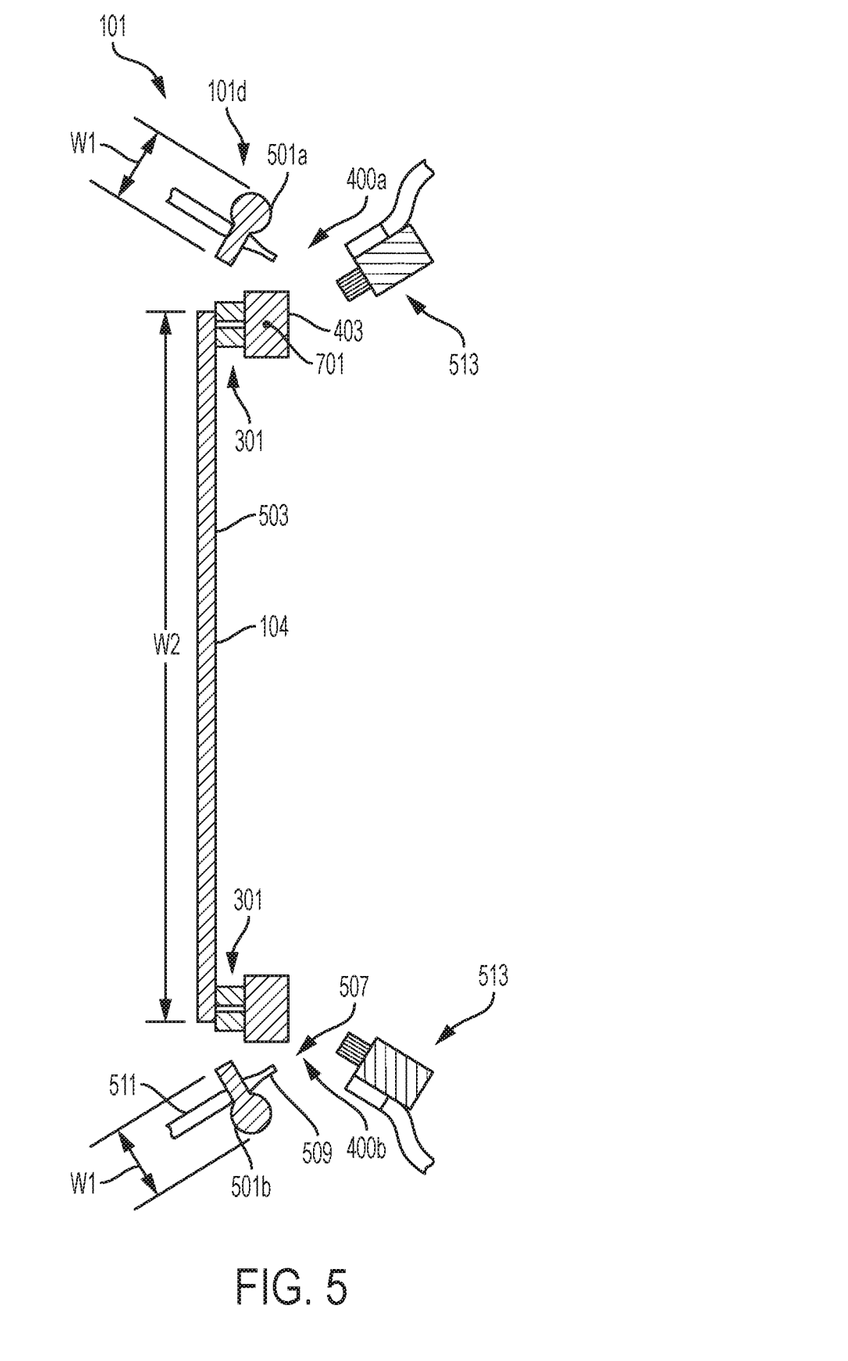
FIG. 5 illustrates separating the glass substrate along the score line.

The glass scoring and separation apparatus 101d can be associated with one or both of the first vertical edge 153 and second vertical edge 155 of the glass sheet 104. For example, as shown in FIG. 4, the glass scoring and separation apparatus 101d can include a first glass scoring and separation apparatus 400a associated with the first vertical edge 153 of the glass sheet 104 and a second glass scoring and separation apparatus 400b associated with the second vertical edge 155 of the glass sheet 104. As shown in FIG. 5, the first glass scoring and separation apparatus 400a may be designed to separate a first vertical edge portion 501a from a high-quality central portion 503 of the glass sheet 104. Furthermore, if provided, the second glass scoring and separation apparatus 400b may be designed to separate a second vertical edge portion 501b from the high-quality central portion 503 of the glass sheet 104. In some embodiments, only a single glass scoring and separation apparatus may be provided. Such embodiments may be beneficial where only a single vertical edge portion is to be separated, or where the vertical edge portions may be removed sequentially by the same glass scoring and separation apparatus. However, as shown, providing each vertical edge 153, 155 with a corresponding dedicated glass scoring and separation apparatus 400a, 400b can increase processing speed of removing both vertical edge portions by using each glass scoring and separation apparatus to simultaneous separate both vertical edge portions 501a, 501b.

The first glass scoring and separation apparatus can be similar or identical to the second glass scoring and separation apparatus. For instance, as shown in FIG. 4, the first glass scoring and separation apparatus 400a can be a mirror image of the second glass scoring and separation apparatus 400b along a vertical axis of the glass sheet 104. As such, unless otherwise noted, the following description may refer the glass scoring and separation apparatus 101d, the first glass scoring and separation apparatus 400a, and/or the second glass scoring and separation apparatus 400a with the understanding that such description may apply equally to the first glass scoring and separation apparatus 400a and the second glass scoring and separation apparatus 400b.

As shown, the glass scoring and separation apparatus 101d of the glass manufacturing apparatus 101 can include an elongated engagement surface 303 that can engage the second major surface 215b of the glass sheet 104 while a scoring device 305 produces a score line 401 in the first major surface 215a of the glass sheet 104. As shown, the elongated engagement surface 303 can comprise a substantially flat surface. Although some embodiments may provide the elongated engagement surface 303 as a rounded surface, the illustrated substantially flat surface can help ensure that the scoring device 305 produces the score line 401 between a scoring element 307 and the elongated engagement surface 303. Such positioning can allow the elongated engagement surface 303 to adequately support a separation path of the glass sheet 104 between the scoring element 307 and the elongated engagement surface while the scoring element 307 presses against the first major surface 215a to produce the score line 401 in the first major surface 215a of the glass sheet 104.

Figure 3:
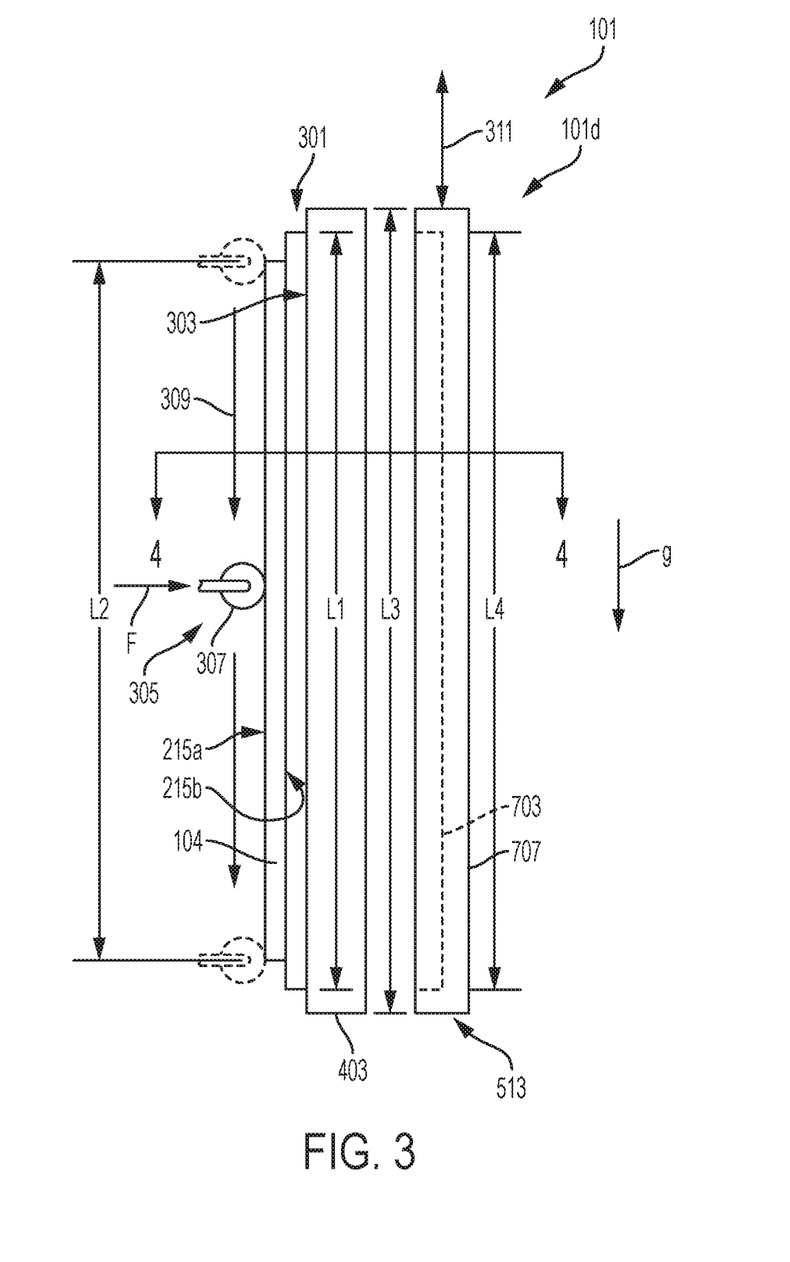
FIG. 3 illustrates a side view of the glass manufacturing apparatus taken along line 3-3 of FIG. 1 without illustrating the glass handling apparatus for clarity.

As further illustrated in FIG. 3, the glass manufacturing apparatus 101 can include an elongated member 301 comprising the elongated engagement surface 303. The elongated member 301 can comprise a wide range of materials. For instance, in some embodiments, the elongated member 301 can comprise a resilient material such as a resilient polymeric material, resilient elastomeric material or other material types. Providing the elongated member 301 as a resilient material can help reduce impact stress of the scoring element 307 against the first major surface 215a of the glass sheet 104, thereby avoiding stress fractures, jumping of the scoring element during landing of the scoring element, or other imperfections or undesired characteristics associated with the scoring processes.

As shown in FIG. 3, the elongated member 301 can have an elongated length "L1" that can extend in the direction of gravity "g". In addition or alternatively, the elongated length "L1" can extend substantially parallel to at least one of the first vertical edge 153 and/or the second vertical edge 155. Providing the elongated member 301 to extend in the direction of gravity "g" can allow removal of vertical edge portions 501a, 501b (see FIG. 5) from a high-quality central portion 503 of the glass sheet 104 while the glass sheet 104 is hung from an upper portion. Indeed, as shown in FIG. 1, the glass sheet can be hung from an upper portion by clamps 161 of the glass handling apparatus 101c while the vertical edge portions 501a, 501b are removed from the high-quality central portion 503 of the glass sheet 104. In further embodiments, as shown, the elongated member 301 can be substantially parallel to the at least one of the first vertical edge 153 and/or the second vertical edge 155 to allow edge portions of predetermined width "W1" to be removed from the glass sheet 104 to leave the high-quality central portion 503 with parallel edges 505a, 505b defining a constant predetermined width "W2" therebetween along a length "L2" of the glass sheet 104.

In some embodiments, the elongated length "L1" of the elongated member 301 can be greater than or equal to the length "L2" of the glass sheet 104. Indeed, in the embodiment shown in FIG. 3, the elongated length "L1" of the elongated member 301 can be greater than the length "L2" of the glass sheet 104. In such embodiments, the elongated member 301 can allow the elongated engagement surface 303 to engage and support the entire separation path along the entire length "L2" such that, as illustrated, the scoring device 305 can create the score line 401 along the entire length "L2" of the glass sheet 104. In some embodiments, the elongated length "L1" can be within a range of from about 100% to about 140% of the length "L2" of the glass sheet 104. In some embodiments, the elongated length "L1" can be within a range of from about 100% to about 120% of the length "L2" of the glass sheet 104. In some embodiments, the elongated length "L1" can be within a range of from about 100% to about 110% of the length "L2" of the glass sheet 104.

With further reference to FIG. 3, the elongated member 301 can include an elongated base 403. In some embodiments, the elongated base 403 can include an elongated length "L3" that can be greater than or equal to the elongated length "L1" of the elongated member 301. Indeed, as shown in FIG. 3, the elongated length "L3" of the elongated base 403 can have be greater than the elongated length "L1" of the elongated member 301. In such embodiments, the elongated base 403 can support the elongated member 301 along the entire elongated length "L1" of the elongated member 301. As such, the elongated base 403 can support the entire length of the elongated member 301 to allow the elongated member 301 to engage and support the entire separation path along the entire length "L2" of the glass sheet 104. In some embodiments, the elongated length "L3" can be within a range of from about 100% to about 140% of the elongated length "L1". In some embodiments, the elongated length "L3" can be within a range of from about 100% to about 120% of the length "L1". In some embodiments, the elongated length "L3" can be within a range of from about 100% to about 110% of the length "L1".

Figure 7:
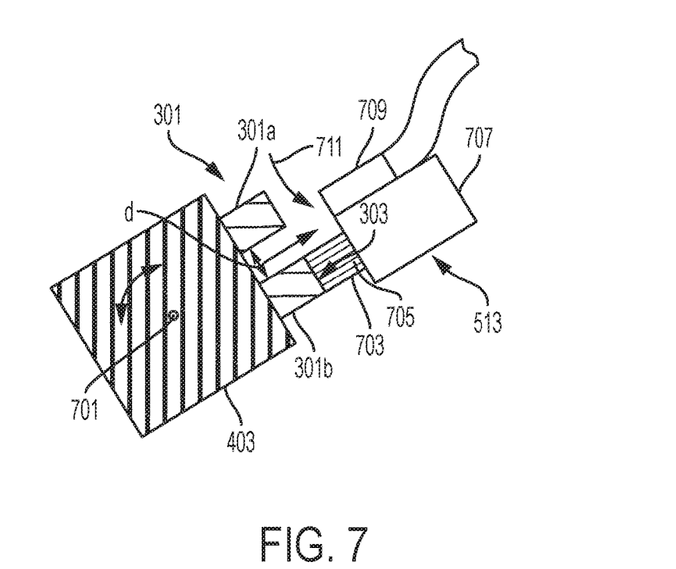
FIG. 7 is an enlarged view of the glass manufacturing apparatus taken at view 7 of FIG. 6.

In some embodiments, the elongated member 301 can include a single elongated member. Alternatively, in further embodiments, the elongated member can include a plurality of elongated members. For instance, the elongated member 301 can include a first and second elongated member such as an inner elongated member 301a and outer elongated member 301b illustrated in FIG. 4. As shown in FIG. 7, the second elongated member 301b (e.g., outer elongated member shown in FIG. 4) may be spaced a distance "d" from the first elongated member 301a (e.g., the inner elongated member shown in FIG. 4). In some embodiments, as shown in FIG. 4, the second elongated member 301b (e.g., outer elongated member shown in FIG. 4) may act as an anvil member for producing the score line 401 along the separation path with the scoring device 305. The separate first elongated member 301a (e.g., inner elongated member shown in FIG. 4), if provided, can act as a barrier to glass particles or other debris generated during scoring or separating from contacting the second major surface 215b of the glass sheet. Rather, for example, glass debris generated during scoring or separating may be blocked by the inner elongated member 301a and perhaps be trapped within the space between the inner and outer elongated member 301a, 301b. As such, the inner elongated member 301a can optionally be provided, in addition to the outer elongated member 301b, to help maintain the pristine surface of the high-quality central portion 503 of the glass sheet 104 by preventing glass debris generated during scoring and/or separating from being deposited on the second major surface 215b of the glass sheet 104.

Figure 6:
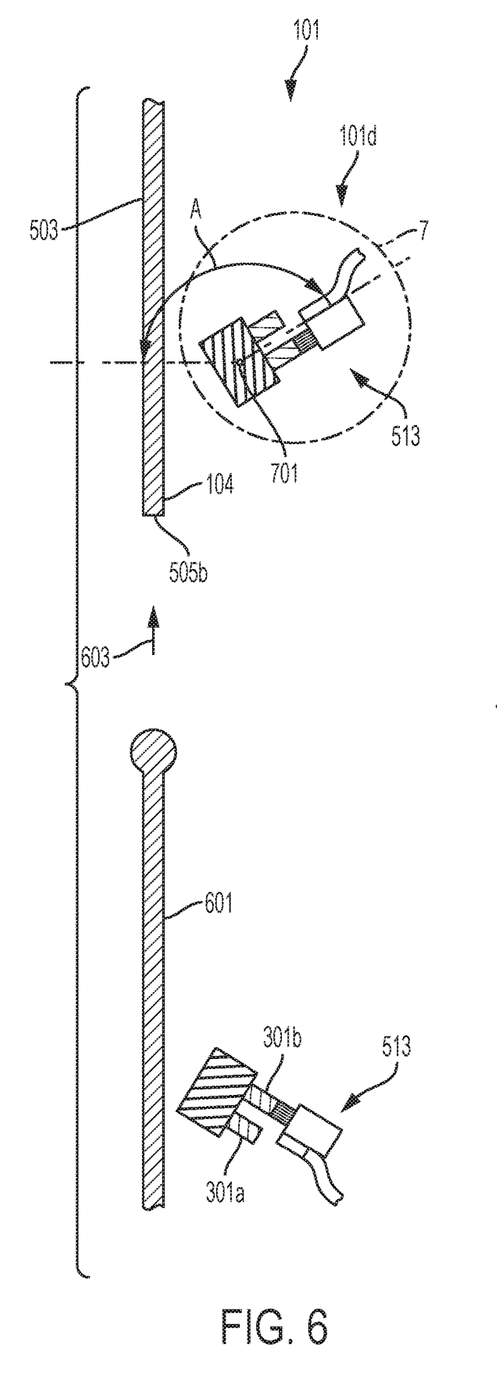
FIG. 6 illustrates cleaning the elongated engagement surface after the elongated engagement surface has been rotated from the scoring position to a cleaning position.

As shown in FIGS. 4-7, the elongated engagement surface 303 may be rotatable through a rotation angle "A" (see FIG. 6) between a scoring position (see FIG. 4) to a cleaning position (see FIGS. 6 and 7). In the illustrated embodiment, the elongated engagement surface 303 can rotate by pivoting about an axis 701 extending along the length of the elongated base 403, such as along an axis of symmetry of the elongated base 403. In alternative embodiments, the axis 701 may be offset a distance from the elongated base 403. In further embodiments, the elongated engagement surface 303 may rotate without pivoting about a fixed pivot axis. For example, the elongated engagement surface 303 may pivot about an axis that moves as the elongated engagement surface 303 pivots through the rotation angle "A".

The rotation angle "A" can be a wide range of angles that allow cleaning of the elongated engagement surface 303 while positioning potentially contaminating debris away from the pristine major surfaces of the high-quality central portion 503 of the glass sheet 104. Furthermore, as shown in FIG. 6, the rotation angle "A" can be selected to allow a second glass substrate 601 (e.g., the illustrated second glass sheet) to at least partially enter the scoring zone during cleaning of the elongated engagement surface 303. In some embodiments, the rotation angle "A" can be within a range of 90° to 270°. In further embodiments, the rotation angle "A" can be within a range of from 90° to 180°. In further embodiments, the rotation angle "A" can be within a range of from 90° to 135°.

As shown in FIGS. 3 and 4, the scoring device 305 can score the glass substrate 104 when the elongated engagement surface 303 is positioned in the scoring position. A wide range of scoring devices may be used in accordance with embodiments of the disclosure. For instance, as shown, the scoring device 305 can comprise a scoring element 307 in the form of the illustrated scoring wheel. In further embodiments, the scoring element 307 can comprise a pointed scribe. As shown, the scoring device 305 can travel along direction 309 that may be parallel to the elongated engagement surface 303. While traveling along direction 309, a force "F" may be applied such that the elongated engagement surface 303 acts as an anvil as the elongated engagement surface 303 presses against the second major surface 215b of the glass sheet 104 to counteract the force "F". In some embodiments, as shown in broken lines in FIG. 3, the scoring device 305 may travel the entire length "L2" of the glass sheet 104 to produce the score line 401 extending along the entire length "L2" of the glass sheet 104.

As shown in FIG. 5, after creating the score line 401, a separation device 507 may be used to apply a force to the vertical edge portion(s) 501a, 501b to separate the vertical edge portion(s) 501a, 501b from the high-quality central portion 503 of the glass sheet 104 along the previously-formed score line 401. For example, a force can be applied to the vertical edge portions 501a, 501b such that an interaction of the glass sheet 104 with the elongated engagement surface 303 causes a stress concentration at the score line 401. As a result, a full body crack can propagate between the first and second major surfaces of the glass sheet 104 at the score line 401 wherein the vertical edge portions 501a, 501b separate from the high-quality central portion 503 along the score line 401. Force can be applied to the vertical edge portions 501a, 501b with a wide range of devices. In one embodiment, one or more suction cups and/or one or more engagement devices may be used alone or in combination to separate the vertical edge portions 501a, 501b. In the illustrated embodiment, as shown in FIG. 5, one or more suction cups 509 may engage a surface of the vertical edge portions 501a, 501b to pull the vertical edge portion and a compression finger 511 may be used to push the vertical edge portion. As a result of pushing with the compression finger 511 and pulling with the suction cup(s) 509, sufficient force may be applied to cause separation of the vertical edge portions 501a, 501b from the high-quality central portion 503 of the glass sheet 104.

The process of scoring and/or separation can leave behind debris (e.g., glass particles, glass shards, score wheel particles, etc.) on the elongated engagement surface 303. As shown in FIG. 5, the present disclosure provides the glass scoring and separation apparatus 101d with a cleaning device 513 designed to remove debris from the elongated engagement surface 303 prior to engagement of the elongated engagement surface 303 with a subsequent glass substrate for a subsequent scoring and separation procedure. The cleaning device 513 of the present disclosure prevents residual debris from one glass scoring and separation procedure from being transferred to the pristine surfaces of a subsequent glass substrate. As such, the cleaning device 513 can prevent transfer of debris that may otherwise damage the pristine surfaces of the glass substrate during subsequent scoring and separation procedures.

As shown in FIGS. 6-7, the cleaning device 513 can clean the elongated engagement surface 303 when the elongated engagement surface 303 is positioned in the cleaning position. In some embodiments, as shown in FIG. 7, the cleaning device 513 can include an elongated brush 703 with a plurality of bristles 705 mounted to an elongated base 707. The bristles can be fabricated from a wide range of materials such as polymeric materials that are designed to engage the elongated engagement surface 303 without damaging the elongated engagement surface 303 even after repeated cycles and reciprocation. As shown in FIG. 3, the elongated brush 703 (shown in broken lines) may optionally be configured for linear reciprocal movement along the direction of double arrow 311. In some embodiments, the elongated brush includes an elongated length "L4" that may be greater than or equal to the elongated length "L1" of the elongated engagement surface 303, thereby reducing cleaning time by allowing agitation of the bristles 705 simultaneously across the entire elongated length "L1" of the elongated engagement surface 303 with a minimal stroke length. In further embodiments, the elongated length "L4" may be slightly less than the entire elongated length "L1" of the elongated engagement surface 303. In such embodiments, a minimal stroke length can still allow the bristles 705 to engage the entire elongated engagement surface 303 even if the elongated length "L4" is slightly less than the elongated length "L1" of the elongated engagement surface 303. In some embodiments, the elongated length "L4" of the elongated brush 703 can be within a range of from 90% to 150% of the elongated length "L1". In further embodiments, the elongated length "L4" of the elongated brush 703 can be within a range of from about 95% to about 120% of the elongated length "L1". In further embodiments, the elongated length "L4" of the elongated brush 703 can be within a range of from about 100% to about 110% of the elongated length "L1" of the elongated engagement surface 303.

In addition to the elongated brush 703, or alternatively to the elongated brush 703, the cleaning device 513 may include a vacuum device 709 configured to vacuum debris when the elongated engagement surface 303 is in the cleaning position. The vacuum device 709 may be designed to remove debris from the elongated engagement surface 303 during brushing of the elongated engagement surface. Furthermore, the vacuum device 709 may remove debris trapped within the area between the inner elongated member 301*a* and the outer elongated member 301*b* during the scoring and/or separation process.

Although not shown, further configurations may be designed to clean the elongated engagement surface 303. For example, rather than a brush, an air knife may be used to remove debris from the elongated engagement surface. In further embodiments, liquid may be used to clean the elongated engagement surface 303. However, compared to an air knife, a brush can have the advantage of avoiding entraining the debris in an air stream that may contaminate the surrounding clean area, thereby possibly contaminating the pristine surfaces of the high-quality central portion of glass sheets being processed. Further, compared to the use of liquid, the brush can reduce the cleaning time by removing subsequent drying steps.

A method of manufacturing a glass substrate (e.g., the illustrated glass sheet 104) including the first major surface 215*a* and the second major surface 215*b* opposite the first major surface 215*a* will now be described. The method can include engaging a second major surface of the glass substrate with the elongated engagement surface while the elongated engagement surface is positioned in the scoring position and the glass substrate is positioned in the scoring zone. For example, as shown in FIG. 4, the second major surface 215*b* of the glass sheet 104 may be engaged with the elongated engagement surface 303 while the elongated engagement surface 303 is positioned in the scoring position and the glass sheet 104 is positioned in the scoring zone.

The method can then include the step of scoring the first major surface of the glass substrate to produce the score line in the first major surface of the glass substrate while the second major surface of the glass substrate is engaged with the elongated engagement surface. The elongated engagement surface is positioned in the scoring position, and the glass substrate is positioned in the scoring zone. For example, as shown in FIGS. 3-4, the scoring device 305 may be moved in direction 304 to traverse the scoring element 307 (e.g., scoring wheel) across the first major surface 215*a* to produce the score line 401. As will be appreciated in FIG. 3, the score line 401 can comprise a straight line that extends in direction 309. In some embodiments, a component of the score direction comprises the direction "g" of gravity. Indeed, as shown, the direction 309 can comprise a resultant direction that extends entirely in the direction "g" of gravity. Such embodiments can provide vertical score lines for breaking along a vertical separation path that may be used in embodiments where the upper portion of the glass sheet 104 is hung (e.g., with clamps 161) as shown in FIG. 1.

After creating the score line 401, the method can further include the step of separating the glass substrate along the score line. For instance, as shown in FIG. 5, the compression finger and/or the suction cup(s) 509 may be used to separate the first vertical edge portion 501*a* and/or the second vertical edge portion 501*b* from the high-quality central portion 503 along the score line 401.

To avoid cross contamination of residual debris from the scoring and/or separation process to a second glass substrate 601 (see FIG. 6), the elongated engagement surface 303 may be cleaned. Prior to cleaning, the elongated engagement surface 303 may be rotated through the rotation angle "A" (e.g., within a range of from about 90° to about 270°) from the scoring position shown in FIG. 4 to the cleaning position shown in FIGS. 6 and 7. Rotating the elongated engagement surface can facilitate cleaning of the elongated engagement surface 303 during rotation. Indeed, as the elongated engagement surface 303 rotates, there may be a slight interference with the tips of the bristles 705 of the elongated brush 703 as the tips pass over the elongated engagement surface 303. As such, the process of rotating the elongated engagement surface 303 can result in brushing of the elongated engagement surface 303 during rotation (e.g., about axis 701). Furthermore, rotation of the elongated engagement surface 303 can position the elongated engagement surface (and any debris carried by the elongated engagement surface) away from the pristine surfaces of the high-quality central portion 503. As such, cross contamination of the pristine surfaces with debris from cleaning can be reduced since the contaminated surfaces being cleaned are located farther away from the pristine surfaces during cleaning. Furthermore, rotation of the elongated engagement surface 303 can allow the second glass substrate 601 to at least partially enter the scoring zone during cleaning of the elongated engagement surface 303. Indeed, as shown in FIG. 6, while cleaning of the elongated engagement surface 303 is carried out, the second glass substrate 601 travels along direction 603 into the scoring zone while the high-quality central portion 503 from the first substrate travels out of the scoring zone. As such, processing time can be reduced since cleaning of the elongated engagement surface 303 can be carried out while the second glass substrate 601 is moving into position for a subsequent scoring and separation procedure to remove the first and/or second vertical edge portion(s) of the second glass substrate 601.

As shown in FIGS. 6-7, the method can further include cleaning the elongated engagement surface 303 while the elongated engagement surface 303 is positioned in the cleaning position. In some embodiments, the elongated engagement surface 303 may be brushed to clean the elongated engagement surface 303. For instance, as shown in FIG. 3, the elongated base 707 may be reciprocated along double arrow 311 to cause a corresponding reciprocation of the elongated brush 703 to clean the elongated engagement surface 303. In some embodiments, as shown in FIGS. 6 and 7, the vacuum device 709 may draw air in the direction of the arrows 711 to collect debris form the brush and the vicinity of the elongated member 301.

Figure 8:
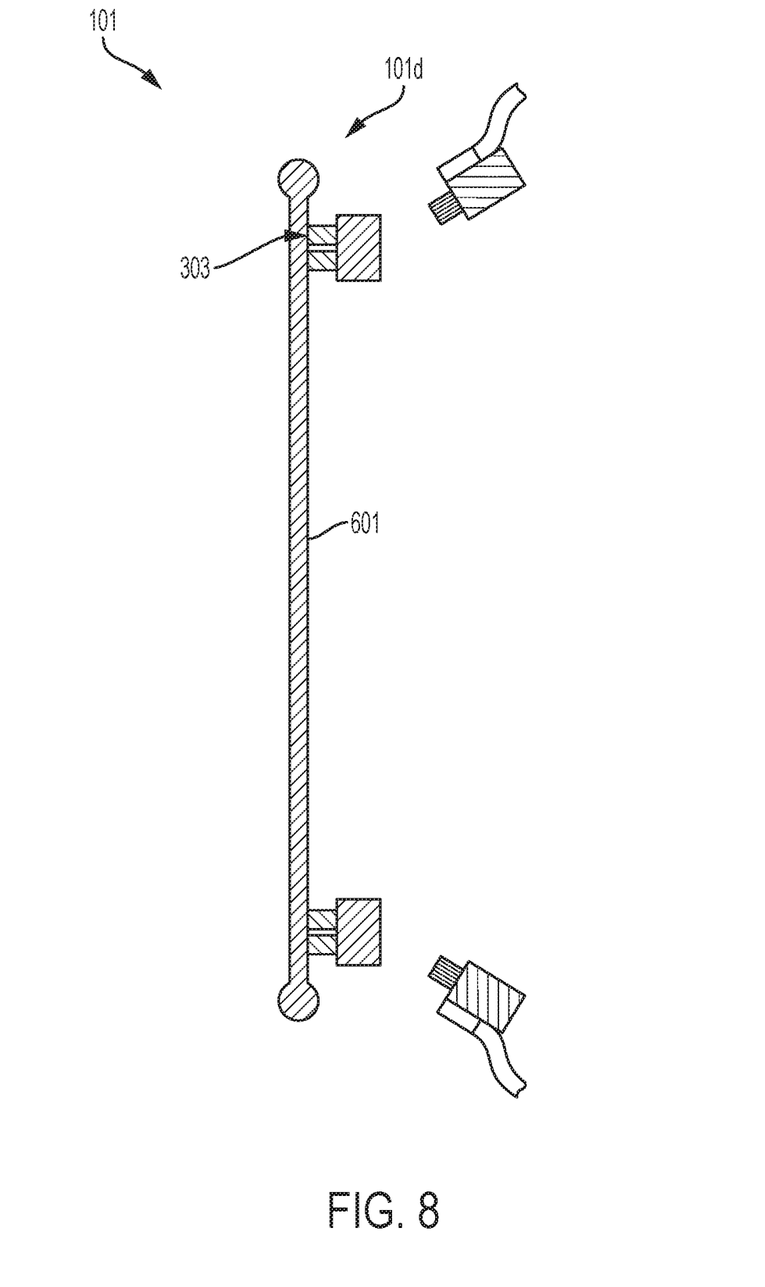
FIG. 8 illustrates the elongated engagement surface of FIG. 6 after the elongated engagement surfaces have been rotated back from the cleaning position to the scoring position.

As shown in FIG. 6, the second glass substrate 601 continues to enter the scoring zone until positioned as shown in FIG. 8. Eventually, the elongated engagement surface pivots back to the scoring position at shown in FIG. 8 to begin the next scoring and separation procedure. As the elongated engagement surface 303 has been cleaned, debris may be inhibited, such as prevented, from transferring to the surfaces of the second glass substrate 601, thereby avoiding possible damage that may otherwise occur without cleaning the elongated engagement surface 303. Moreover, since the glass substrates continue to be conveyed along direction 603 during cleaning, the step of cleaning the elongated engagement surface 303 may be carried out without a significant or any additional time requirement.

It should be understood that while various embodiments have been described in detail with respect to certain illustrative and specific embodiments thereof, the present disclosure should not be considered limited to such, as numerous modifications and combinations of the disclosed features are possible without departing from the scope of the following claims.

What is claimed is:

1. A glass manufacturing apparatus comprising:
   an elongated engagement surface rotatable through a rotation angle between a scoring position and a cleaning position;

a scoring device positioned to score a glass substrate when the elongated engagement surface is positioned in the scoring position; and a cleaning device positioned to clean the elongated engagement surface when the elongated engagement surface is positioned in the cleaning position.

2. The glass manufacturing apparatus of claim 1, wherein the scoring device comprises a scoring wheel.

3. The glass manufacturing apparatus of claim 1, wherein the cleaning device comprises a brush.

4. The glass manufacturing apparatus of claim 3, wherein the brush comprises a linearly reciprocal brush.

5. The glass manufacturing apparatus of claim 3, wherein the brush comprises an elongated brush including an elongated length that is greater than or equal to an elongated length of the elongated engagement surface.

6. The glass manufacturing apparatus of claim 1, wherein the cleaning device comprises a vacuum device.

7. The glass manufacturing apparatus of claim 1, further comprising an elongated member comprising the elongated engagement surface.

8. The glass manufacturing apparatus of claim 7, wherein the elongated member comprises a polymeric material or an elastomeric material.

9. The glass manufacturing apparatus of claim 7, wherein the elongated member comprises a first elongated member and a second elongated member spaced a distance from the first elongated member.

10. The glass manufacturing apparatus of claim 1, wherein the rotation angle is within a range of from 90 degrees to 270 degrees.

11. A method of manufacturing a glass substrate with the glass manufacturing apparatus of claim 1, the method comprising:

engaging a first major surface of the glass substrate with the elongated engagement surface while the elongated engagement surface is positioned in the scoring position and the glass substrate is positioned in a scoring zone;

scoring the second major surface of the glass substrate opposite the first major surface to produce a score line in the second major surface of the glass substrate while the first major surface of the glass substrate is engaged with the elongated engagement surface, the elongated engagement surface is positioned in the scoring position, and the glass substrate is positioned in the scoring zone;

rotating the elongated engagement surface through a rotation angle from the scoring position to the cleaning position; and cleaning the elongated engagement surface while the elongated engagement surface is positioned in the cleaning position.

12. The method of claim 11, wherein cleaning the elongated engagement surface comprises brushing the elongated engagement surface.

13. The method of claim 11, wherein cleaning the elongated engagement surface comprises vacuuming debris.

14. The method of claim 11, wherein a second glass substrate at least partially enters the scoring zone during cleaning of the elongated engagement surface.

15. The method of claim 11, wherein the rotation angle is within a range of from about 90 degrees to about 270 degrees.

16. The method of claim 11, wherein the scoring includes traversing a scoring wheel across the second major surface.

17. The method of claim 11, further comprising separating the glass substrate along the score line.

18. The method of claim 11, wherein the score line extends in a score direction, and a component of the score direction comprises the direction of gravity.

19. The method of claim 11, wherein the glass substrate comprises a glass sheet.

20. The method of claim 11, wherein the glass sheet hangs from an upper portion of the glass sheet while scoring the second major surface.

21. The glass manufacturing apparatus of claim 3, wherein the elongated engagement surface is rotatable through the rotation angle from the scoring position until the elongated engagement surface engages the brush in the cleaning position.

* * * * *